United States Patent
Kimura et al.

(10) Patent No.: US 8,030,381 B2
(45) Date of Patent: Oct. 4, 2011

(54) GRANULAR ADDITIVE COMPOSITION

(75) Inventors: Kenji Kimura, Toyonaka (JP); Hiroshi Kajikuri, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 169 days.

(21) Appl. No.: 12/149,041

(22) Filed: Apr. 25, 2008

(65) Prior Publication Data
US 2008/0306192 A1 Dec. 11, 2008

(30) Foreign Application Priority Data

Apr. 27, 2007 (JP) ................................ 2007-118649
Jun. 4, 2007 (JP) ................................ 2007-147800

(51) Int. Cl.
*C08K 5/521* (2006.01)
*C08K 5/36* (2006.01)
(52) U.S. Cl. ...................................... 524/141; 524/155
(58) Field of Classification Search .................. 524/155, 524/141
See application file for complete search history.

(56) References Cited

U.S. PATENT DOCUMENTS

| 4,298,520 | A | * | 11/1981 | Minagawa et al. | ........... 524/119 |
| 5,597,857 | A | | 1/1997 | Thibaut et al. | |
| 5,844,042 | A | * | 12/1998 | Neri et al. | ........... 523/223 |
| 6,610,765 | B1 | * | 8/2003 | Pfaendner et al. | ........... 524/108 |
| 2001/0044518 | A1 | | 11/2001 | Hoffmann et al. | |
| 2004/0014854 | A1 | * | 1/2004 | Watanabe et al. | ........... 524/210 |

FOREIGN PATENT DOCUMENTS

| EP | 0 719 824 | 7/1996 |
| EP | 1 780 236 | 5/2007 |
| EP | 2 236 551 | 10/2010 |
| JP | 8-333477 | 12/1996 |

OTHER PUBLICATIONS

Extended European Search Report issued Nov. 17, 2010 in corresponding European Application No. EP 08 15 4929.
M. Gönen et al., "Preparation and Characterization of Calcium Stearate Powders and Films Prepared by Precipitation and Langmuir-Blodgett Techniques," Ind. Eng. Chem. Res., vol. 49, 2010, pp. 1732-1736.

* cited by examiner

*Primary Examiner* — Milton I Cano
*Assistant Examiner* — John Uselding
(74) *Attorney, Agent, or Firm* — Wenderoth, Lind & Ponack, L.L.P.

(57) ABSTRACT

An object of the present invention is to provide a low-dusting additive composition which can improve thermal coloration resistance of a thermoplastic resin. This object is achieved by a granular additive composition containing 5 to 70% by weight of fatty calcium and 5 to 50% by weight of a sulfur-based compound represented by the formula (1), wherein an infrared absorption spectrum of the composition has a maximum absorption peak A in which absorbance in 1540 $cm^{-1}$ to 1543 $cm^{-1}$ is a maximum value, and a maximum absorption peak B in which absorbance in 1575 $cm^{-1}$ to 1583 $cm^{-1}$ is a maximum value, and the absorbances of the peak A and the peak B are a maximum value and a next maximum value in 1540 $cm^{-1}$ to 1583 $cm^1$, $$(R_1-Y-S-C_2H_4CO_2)_m-Z \qquad (1)$$

where $R_1$ represents an alkyl group, Y represents a single bond, or a -$C_2H_4CO_2$— group, m represents an integer of 1 to 4, and Z represents an alcohol residue.

28 Claims, 4 Drawing Sheets

GRANULAR ADDITIVE COMPOSITION

This application claims priority to JP 2007-147800, filed Jun. 4, 2007 and JP 2007-118649, filed Apr. 27, 2007.

FIELD OF THE INVENTION

The present invention relates to a low-dusting additive composition which gives a thermoplastic resin composition excellent in thermal coloration resistance.

BACKGROUND ART

A thermoplastic resin is used as a thermoplastic resin composition by incorporating an additive such as calcium stearate in order to prevent its thermal deterioration.

Generally, upon incorporation of an additive in the powdery state into a thermoplastic resin, there was a problem of powdering of an additive and dust explosiveness. As a method of solving this problem, Patent Publication 1 proposes that a granular additive composition (granule) is incorporated into a thermoplastic resin, specifically, discloses an additive composition comprising calcium stearate having a water content of less than 2%, which is obtained by extrusion molding at a high temperature, and a process for producing the same.

[Patent Publication 1] JP-A No. 8-333477 ([0142], [Example 2], [0144], [Table 2])

DISCLOSURE OF THE INVENTION

The present inventors obtained an additive composition comprising calcium stearate having a water content of less than 2% by granulation at a high temperature, and melting-kneaded it into a thermoplastic resin, and it was made clear that the resulting thermoplastic resin composition becomes yellowish.

An object of the present invention is to provide an additive composition having low dusting property, which can improve coloration resistance under a high temperature of a thermoplastic resin (referred to as thermal coloration resistance in some cases), in an additive composition containing fatty calcium such as calcium stearate, and a process for producing the same.

The present inventors found out that a granular additive composition containing fatty calcium and a specified compound, and having a specified infrared absorption spectrum derived from the fatty calcium exhibiting a specified spectrum solves such the problems. And, the present inventors found out that such the composition is obtained by granulating a mixture comprising fatty calcium monohydrate and the specified compound in a temperature range of 40 to 80° C.

That is, the composition of the present invention is a granular additive composition comprising 5 to 70% by weight of fatty calcium and 5 to 50% by weight of a sulfur-based compound represented by the formula (1), wherein an infrared absorption spectrum obtained by measuring the composition has a maximum absorption peak A in which absorbance in a range of a wave number 1540 cm$^{-1}$ to 1543 cm$^{-1}$ is a maximum value, and a maximum absorption peak B in which absorbance in a range of a wave number 1575 cm$^{-1}$ to 1583 cm$^{-1}$ is a maximum value, and the absorbance of the peak A and the absorbance of the peak B are a maximum value and a next maximum value as absorbance of a maximum absorption peak in a range of a wave number 1540 cm$^{-1}$ to 1583 cm$^{-1}$.

$$(R_1-Y-S-C_2H_4CO_2)_m-Z \quad (1)$$

[In the formula (1), $R_1$ represents an alkyl group having a carbon number of 12 to 18, Y represents a single bond, or a —$C_2H_4CO_2$— group, m represents an integer of 1 to 4, and Z represents a m-hydric alcohol residue having a carbon number of 5 to 18]

In addition, the process of the present invention is a process for producing a granular additive composition, comprising preparing a mixture of 100 parts by weight of fatty calcium monohydrate, and 7 to 1000 parts by weight of a sulfur-based compound represented by the formula (1), and granulating the mixture at a temperature range of 40 to 80° C.

Inter alia, when the granular additive composition contains at least one kind additive selected from the group consisting of a phenol-based compound represented by the formula (2), and a phosphorus-based compound represented by the formula (3) to the formula (5), the composition is not embrittled when stored for a long term, that is, is excellent in oxidation resistance, being preferable.

[In the formula (2), $R_2$ represents a linear alkyl group having a carbon number of 1 to 8, or a branched alkyl group having a carbon number of 3 to 8, X represents a n-hydric alcohol residue of a carbon number of 1 to 18 optionally comprising a hetero atom and/or a cyclic group, and n represents an integer of 2 to 4]

[In the formula (3), three $R_4$s, three $R_5$s, and three $R_6$s each represent independently a hydrogen atom, or a linear alkyl group having a carbon number of 1 to 9, or a branched alkyl group having a carbon number of 3 to 9]

[In the formula (4), two $R_7$s, two $R_8$s and two $R_9$s each represent independently a hydrogen atom, a linear alkyl group having a carbon number of 1 to 9, or a branched alkyl group having a carbon number of 3 to 9]

(5)

[In the formula (5), two $R_{11}$s, two $R_{12}$s, $R_{14}$ and $R_{15}$ each represent independently a hydrogen atom, a linear alkyl group having a carbon number of 1 to 9, a branched alkyl group having a carbon number of 3 to 9, a cycloalkyl group having a carbon number of 5 to 8, an alkylcycloalkyl group having a carbon number of 6 to 12, an aralkyl group having a carbon number of 7 to 12, or a phenyl group, two $R_{13}$s each represent independently a hydrogen atom or an alkyl group having a carbon number of 1 to 9, B represents a single bond, a sulfur atom, or a —$CHR_{16}$— group, wherein $R_{16}$ represents a hydrogen atom, an alkyl group having a carbon number of 1 to 9, or a cylcoalkyl group having a carbon number of 5 to 8, A represents an alkylene group having a carbon number of 2 to 8, or a *—C(=O)$R_{17}$— group, wherein $R_{17}$ represents a single bond, or an alkylene group having a carbon number of 1 to 8, and a symbol * represents a bond with an oxygen atom side of a >P—O— portion, one of C and D represents a hydroxyl group, an alkoxy group having a carbon number of 1 to 8, or an aralkyloxy group having a carbon number of 7 to 12, and the other of C and D represents a hydrogen atom, or an alkyl group having a carbon number of 1 to 8, provided that, when C is a hydroxyl group, one of $R_{14}$ and $R_{15}$ represents a linear alkyl group having a carbon number of 3 to 8, a branched alkyl group having a carbon number of 3 to 8, a cycloalkyl group having a carbon number of 5 to 8, an alkylcycloalkyl group having a carbon number of 6 to 12, an aralkyl group having a carbon number of 7 to 12, or a phenyl group]

In addition, when the granular additive composition further contains fatty acid amide, adherability of an incorporated thermoplastic resin composition tends to be suppressed, being preferable.

In addition, when the granular additive composition further contains a metal silicate salt, mechanical physical property of an incorporated thermoplastic resin composition tends to be improved, being preferable.

The granular additive composition of the present invention is low dusting, and is easy to handle upon incorporation into a thermoplastic resin. When the granular additive composition of the present invention is incorporated into a thermoplastic resin, a thermoplastic rein composition excellent in thermal coloration resistance can be obtained.

BRIEF DESCRIPTION OF THE DRAWINGS

In the figures, A denotes a set temperature position of an adapter part, C1 to C4 denote a set temperature position of an extrusion kneading part, D denotes a set temperature position of a die part, C denotes a cylinder part (extrusion kneading part), and E denotes a screw.

MODE FOR CARRYING OUT THE INVENTION

The present invention will be explained in detail below.
Fatty calcium used in the present invention is a calcium salt of fatty acid having a carbon number of 4 to 22, preferably a carbon number of 10 to 18. As the fatty acid in the metal salt of fatty acid, stearic acid and palmitic acid are preferable.

Inter alia, commercially available calcium stearate (usually, a mixture of calcium stearate and calcium palmitate) is preferable.

Examples of the commercially available fatty calcium include AULABRITE (registered trademark) NC calcium stearate S (manufactured by NOF CORPORATION), calcium stearate manufactured by KYODO CHEMICAL CO., LTD, and calcium stearate manufactured by SHINAGAWA CHEMICAL INDUSTRY CO., LTD (trade name SAK).

In an infrared absorption spectrum obtained by measuring fatty calcium, the fatty calcium has a maximum absorption peak a in which absorbance in a range of a wave number 1540 $cm^{-1}$ to 1543 $cm^{-1}$ is a maximum value, and a maximum absorption peak b in which absorption in a range of wave number 1575 $cm^{-1}$ to 1583 $cm^{-1}$ is a maximum value, and the peak a and the peak b are maximum absorption peaks in which absorbance has a maximum value and a next maximum value in a range of a wave number 1540 $cm^{-1}$ to 1583 $cm^{-1}$.

The maximum absorption peaks a and b are peaks derived from vibration of a carbonyl group of fatty calcium monohydrate and, when water of crystallization is removed from fatty calcium, a peak derived from vibration of a carbonyl group of fatty calcium containing no water of crystallization is generated between the two peaks.

A granular additive composition in which much water of crystallization of fatty calcium contained in the granular additive composition is removed, thereby, a peak derived from vibration of a carbonyl group of fatty calcium containing no water of crystallization has greater absorbance than that of the two peaks, reduces thermal coloration resistance of the resulting thermoplastic resin composition, being not preferable.

Peaks A and B observed in an infrared absorption spectrum obtained by measuring the granular additive composition of the present invention are derived from peaks a and b of fatty calcium.

The commercially available fatty calcium is a monohydrate, or a mixture of a monohydrate and an anhydride. In the present invention, when fatty calcium monohydrate is used as a raw material, and the raw material is retained at 80° C. or lower at production and storage of a granular additive composition, almost of fatty calcium monohydrate does not lose water of crystallization, consequently, a granular additive composition in which the two maximum absorption peaks are present between 1540 cm$^{-1}$ to 1583 cm$^{-1}$ and, additionally, which gives a grater infrared spectrum than the maximum absorption peaks can be obtained and, when such the granular additive composition is incorporated into a thermoplastic resin, thermal coloration resistance of the resulting thermoplastic resin composition is improved. Preferably, a granular additive composition giving an infrared absorption spectrum not having a maximum absorption peak other than the two peaks between 1540 cm$^{-1}$ to 1583 cm$^{-1}$ is such that, without losing almost water of crystallization of fatty calcium monohydrate in the granular additive composition, thermal coloration resistance of the resulting thermoplastic resin composition is further improved.

Regarding fatty calcium which is a commercially available mixture of monohydride and an anhydride, or an anhydride from which water of crystallization has been lost by such as drying (having a maximum absorption peak other than the two peaks between 1540 cm$^{-1}$ to 1583 cm$^{-1}$), fatty calcium monohydrate can be prepared when the fatty calcium is stored under the pre-moisture-conditioned atmosphere (e.g. in a constant temperature and constant humidity bath of 40° C.×80% relative humidity for around 1 day).

In the granular additive composition, as a content of fatty calcium, a range of 5 to 70% by weight is preferable and, particularly, a range of 8 to 30% by weight is preferable and, particularly, a range of 8 to 30% by weight is preferable since thermal coloration resistance and stability at molding processing tend to be improved, being preferable.

Herein, a weight of fatty calcium includes a weight of water of crystallization.

The granular additive composition of the present invention contains a sulfur-based compound represented by the formula (1) at 5 to 50% by weight, preferably 10 to 40% by weight.

$$(R_1—Y—S—C_2H_5CO_2)_m—Z \qquad (1)$$

In the formula (1), $R_1$, represents a linear alkyl group having a carbon number of 12 to 18, or a branched alkyl group having a carbon number of 12 to 18, Y represents a single bond, or a —$C_2H_4CO_2$— group, m represents an integer of 1 to 4, and Z represents a m-hydric alcohol residue having a carbon number of 5 to 18.

Herein, as $R_1$ in the compound (1), a dodecyl group, a tetradecyl group or an octadecyl group is preferable.

In addition, the alcohol residue refers to a part other than a hydrogen atom of a hydroxy group of an alcohol. Examples of a preferable alcohol residue Z include, as expressed by an alcohol, dodecyl alcohol, tetradecyl alcohol, octadecyl alcohol, and pentaerythritol. Particularly, when Y in the compound (1) is a single bond, a compound in which $R_1$ is a dodecyl group, n is 4, and Z is a pentaerythritol residues is preferable. In addition, when Y is a —$C_2H_4CO_2$— group, it is preferable that $R_1$ is a dodecyl group, a tetradecyl group or an octadecyl group, m is 1, and Z is an alcohol residue having a carbon number of 12, 14 or 18 corresponding to the $R_1$.

When Y is a —$C_2H_4CO_2$— group, usually, an alcohol residue and Y are bound with an ester group. Specifically, Z is monohydric, it is —$C_2H_4CO_2$—Z.

When the compound (1) is 5% by weight or more, there is a tendency that granulation and melting easily progress, and a fine powder is suppressed, being preferable. And, when the compound (1) is 50% by weight or less, a granule having a large particle diameter is reduced upon granulation, and a content of an optional component in the additive composition, specifically, a phosphorus-based compound and a phenol-based compound described later can be increased, being preferable.

Examples of the compound (1) usable in the present invention include:
3,3'-thiodipropionic acid di-n-dodecyl ester,
3,3'-thiodipropionic acid di-n-tetradecyl ester,
3,3'-thiodipropionic acid di-n-octadecyl ester tetrakis(3-dodecylthiopropionic acid) pentaerythrityl ester.

When the additive composition of the present invention contains a phenol-based compound represented by the formula (2), thermal coloration resistance and oxidation resistance of a thermoplastic resin composition with the additive composition of the present invention incorporated therein tend to be increased, being preferable. A content of the phenol-based compound (2) in the additive composition is usually 0 to 90% by weight, preferably 1 to 20% by weight.

A weight ratio of the sulfur-based compound (1) and the phenol-based compound (2) is around (1):(2)=50:0 to 1:18, preferably 40:1 to 1:4, inter alia, preferably 4:1 to 1:2.

In the formula (2), $R_2$ represents a linear alkyl group having a carbon number of 1 to 8 or a branched alkyl group having a carbon number of 3 to 8 such as a methyl group, a t-butyl group, a t-pentyl group, and a t-octyl group. Inter alia, the case where $R_2$ is a methyl group or a t-butyl is preferable.

And, n is 2 to 4.

X is a n-hydric alcohol residue, and the number of carbons contained in X is 1 to 18. Herein, the alcohol residue means a substituent obtained by removing a hydrogen atom of a hydroxy residue from an alcohol.

Alternatively, X may contain a hetero atom such as an oxygen atom, a sulfur atom, and a nitrogen atom, and may contain a cyclic group such as an alicyclic ring group such as a cyclopentane structure and a cyclohexane structure, and an aromatic group such as a benzene structure. Of course, a carbon atom of the cyclic group may be substituted with a hetero atom.

To exemplify the alcohol residue as a form of an alcohol, examples include triethylene glycol, 3,9-bis(2-hydroxy-1,1-dimethylethyl)-2,4,8,10-tetraoxaspiro[5.5]undecane, and pentaerythritol. Inter alia, stearyl alcohol, triethylene glycol, 3,9-bis(2-hydroxy-1,1-dimethylethyl)-2,4,8,10-tetraoxaspiro[5.5]undecane, and pentaerythritol are preferable.

Examples of the phenol-based compound (2) include 3,9-bis[2-{3-(3-t-butyl-4-hydroxy-5-methylphenyl)propionyloxy}-1,1-dimethylethyl]-2,4,8,10-tetraoxaspiro[5.5]undecane, bis{3-(3-t-butyl-4-hydroxy-5-methylphenyl)propionic acid}triethylene glycol ester, and tetrakis{3-(3,5-di-t-butyl-4-hydroxyphenyl)-propionic acid}pentaerythrityl ester.

A granular additive composition containing substantially only a phenol-based compound represented by the formula (2) as the phenol-based compound is excellent in thermal coloration resistance, being preferable. Substantially means 90 parts by weight or more, preferably 99 parts by weight or more of the phenol-based compound represented by the formula (2) based on 100 parts by weight of all phenol-based compounds contained in the granular additive composition.

When the granular additive composition of the present invention contains a phosphorus-based compound represented by the formulas (3) to (5), thermal coloration resistance and oxidation resistance of a thermoplastic resin composition with the granular additive composition of the present invention incorporated therein tend to be improved, being preferable. A content of the phosphorus-based compound in the granular additive composition is usually 0 to 90% by weight, preferably 1 to 20% by weight.

Inter alia, when at least one kind phosphorus-based compound selected from the group consisting of phosphorus-based compounds (3) to (5) and the phenol-based compound (1) are contained in the granular additive composition of the present invention, thermal coloration resistance and oxidation resistance of a thermoplastic resin composition with the granular additive composition incorporated therein tend to be further improved, being preferable.

A weight ratio of a total weight of phosphorus-compounds (3) to (5) and a weight of the phenol-based compound is phosphorus-based compound: phenol-based compound=around 1:20 to 20:1, preferably 1:2 to 4:1.

In the formula (3), three $R_4$s, three $R_5$s and three $R_6$s each represent independently a linear alkyl group having a carbon atom of 1 to 9, a branched alkyl group having a carbon number of 3 to 9, or a hydrogen atom. Examples of the linear alkyl group and the branched alkyl group include the same groups as those exemplified for the phosphorus-based compound (3). Among them, $R_4$s, $R_5$s and $R_6$s are preferably a hydrogen atom, a methyl group, or a t-butyl group.

Examples of the phosphorus-based compound (3) include tris(nonylphenyl) phosphite, and tris(2,4-di-t-butylphenyl) phosphite.

In the formula (4), two $R_7$s, two $R_8$s, and two $R_9$s each represent independently a linear alkyl group having a carbon number of 1 to 9, a branched alkyl group having a carbon number of 3 to 9, or a hydrogen atom. Examples of the linear alkyl group and the branched alkyl group include the same groups as those exemplified for the phosphorus-based compound (3). Inter alia, $R_7$s, $R_8$s, and $R_9$s are preferably a hydrogen atom, a methyl group, or a t-butyl group.

Examples of the phosphorus-based compound (4) include bis(2,4-di-t-butylphenyl) pentaerythritol diphosphite, and bis(2,6-di-t-butyl-4-methylphenyl) pentaerythritol diphosphite.

In the phosphorus-based compound (5), two $R_{11}$s, two $R_{12}$s, $R_{14}$ and $R_{15}$ each represent independently a hydrogen atom, a linear alkyl group having a carbon number of 1 to 9, a branched alkyl group having a carbon number of 3 to 9, a cycloalkyl group having a carbon number of 5 to 8, an alkylcycloalkyl group having a carbon number of 6 to 12, an aralkyl group having a carbon number of 7 to 12, or a phenyl group.

Herein, examples of the linear alkyl group and the branched alkyl group include the same groups as those exemplified for the phosphorus-based compound (3).

Examples of the cycloalkyl group having a carbon number of 5 to 8 include a cyclopentyl group, a cyclohexyl group, and a cyclopentyl group.

Examples of the alkylcycloalkyl group having a carbon number of 6 to 12 include a methylcyclopentyl group, a methylcyclohexyl group, and a dimethylcyclohexyl group.

Examples of the aralkyl group having a carbon number of 7 to 12 include a benzyl group.

In the phosphorus-based compound (5), two $R_{13}$s each represent independently a hydrogen atom, a linear alkyl group having a carbon number of 1 to 9, or a branched alkyl group having a carbon number of 3 to 9. Herein, examples of the linear alkyl group and the branched alkyl group include the same groups as those exemplified for the phosphorus-based compound (3). As $R_{13}$, a hydrogen atom or a methyl group is preferable.

In the phosphorus-based compound (5), B represents a single bond, a sulfur atom or a —$CHR_{16}$— group, wherein $R_{16}$ represents a hydrogen atom, a linear alkyl group having a carbon number of 1 to 9, a branched alkyl group having a carbon number of 3 to 9, or a cycloalkyl group having a carbon number of 5 to 8. Examples of the linear alkyl group having a carbon number of 1 to 9, the branched alkyl group having a carbon number of 3 to 9, and the cycloalkyl group having a carbon number of 5 to 9 include the same groups as those exemplified for $R_{11}$.

Examples of the —$CHR_{16}$— group include a methylene group, an ethylidene group, a propylidene group, and a 1-cyclohexylmethyl group. As B, a single bond, a methylene group or an ethylidene group is preferable.

In the phosphorus-based compound (5), A represents an alkylene group having a carbon number of 2 to 8, or a *—C(=O)$R_{17}$— group, wherein $R_{17}$ represents a single bond, or an alkylene group having a carbon number of 1 to 8, and a symbol * indicates a bond with an oxygen atom side of a >P—O portion. Examples of the alkylene group having a carbon number of 1 to 8 include a methylene group, an ethylene group, a trimethylene group, and a tetramethylene group. As A, an alkylene group having a carbon number of 2 to 4, or the aforementioned *—$COR_{17}$— group is preferable.

The alkylene group having a carbon number of 2 to 4 may be such that a carbon-carbon bond thereof is interrupted with a group containing a hetero group. Examples of the group containing a hetero group in this case include a —O—C(=O)— group and a —C(=O)—O— group. As $R_{11}$, an alkylene group having a carbon number of 1 to 4 is preferable.

One of C and D represents a hydroxyl group, an alkoxy group having a carbon number of 1 to 8, or an aralkyloxy group having a carbon number of 7 to 12, and the other represents a hydrogen atom, a linear alkyl group having a carbon number of 1 to 8, or a branched alkyl group having a carbon number of 3 to 8. When C is a hydroxyl group, it is preferable that one of $R_{14}$ and $R_{15}$ is a linear alkyl group having a carbon number of 3 to 8, a branched alkyl group having a carbon number of 3 to 8, a cycloalkyl group having a carbon number of 5 to 8, an alkylcycloalkyl group having a carbon number of 6 to 12, an aralkyl group having a carbon number of 7 to 12, or a phenyl group. Examples of the alkoxy group having a carbon number of 1 to 8 include a methoxy group, an ethoxy group, and a t-butoxy group. Examples of the aralkyloxy group having a carbon number of 7 to 12 include a benzyloxy group.

When C in the formula (5) is a hydroxyl group, it is preferable that D is a hydrogen atom or a methyl group, and it is more preferable that one of $R_{14}$ and $R_{15}$ is a t-butyl group.

When D in the formula (5) is a hydroxyl group, it is preferable that $R_{15}$ is a methyl group, C is a hydrogen atom, and $R_{14}$ is a t-butyl group.

Two $R_{11}$s, two $R_{12}$s, or two $R_{13}$s may be the same or different, respectively.

Among the phosphorus-based compound (5), a particularly preferable compound is exemplified below. 6-[3-(3-t-butyl-4-hydroxy-5-methylphenyl)propoxy]-2,4,8,10-tetra-t-butyldibenzo[d,f][1,3,2]dioxaphosphepine, 6-[3-(3,5-di-t-butyl-4-hydroxyphenyl)propoxy]-2,4,8,10-tetra-t-butyldibenzo[d,f][1,3,2]dioxaphosphepine, 6-[3-(3,5-di-t-butyl-4-hydroxyphenyl)propoxy]-4,8-di-t-butyl-2,10-dimethyl-12H-dibenzo[d,g][1,3,2]dioxaphosphosine, and 6-[3-(3,5-di-t-butyl-4-hydroxyphenyl)propionyloxy]-4,8-di-t-butyl-2,10-dimethyl-12H-dibenzo[d,g][1,3,2]dioxaphoaphosine.

When the granular additive composition of the present invention contains fatty acid amide, adherability of a thermoplastic resin composition with the granular additive composition of the present invention incorporated therein tends to be reduced, being preferable. A content of fatty acid amide in the granular additive composition is usually 0 to 90% by weight, preferably 0 to 30% by weight.

Herein, fatty acid amide is saturated or unsaturated fatty acid amide having a carbon number of 4 to 50, preferably a carbon number of 4 to 22. Particularly preferable is a condensate (bisamide) of saturated or unsaturated fatty acid having a carbon number of 4 to 22, and alkylenediamine having a carbon number of 1 to 4.

Examples of the fatty acid amide include saturated monocarboxylic acid amide such as erucic acid amide, and stearic acid amide; unsaturated monocarboxylic acid amide such as oleic acid amide, and behenic acid amide; saturated dicarboxylic acid amide such as N-stearylbutyric acid amide, N-stearyllauric acid amide, N-stearylstearic acid amide, and N-stearylbehenic acid amide; and unsaturated dicarboxylic acid amide such as N-oleyloleic acid amide, N-oleylbehenic acid amide, N-octylerucic acid amide, N-laurylerucic acid amide, ethylenebistearic acid amide, methylenebisstearic acid amide, methylenebisbehenic acid amide, ethylenebisoleic acid amide, methylenebisoleic acid amide, hexamethylenebisoleic acid amide, N,N'-dioleyladipic acid amide, and N,N'-dioleylsebacic acid amide.

When the granular additive composition of the present invention contains a metal silicate salt, mechanical physical property of a thermoplastic resin composition with the granular additive composition of the present invention incorporated therein tends to be improved, being preferable. A content of the metal silicate salt in the granular additive composition is usually 0 to 90% by weight and, when the content is 0 to 60% by weight, mechanical physical property tends to be improved, being preferable.

Herein, the metal silicate salt is a salt of at least one kind metal selected from the group consisting of an alkali metal such as sodium, and potassium, a metal belonging to Group 2 elements such as calcium, and magnesium, a metal belonging to Group 3 elements such as aluminum, iron and manganese, with silicic acid. Among them, magnesium silicate, aluminum silicate, or mica which is a silicate salt of aluminum, potassium, magnesium, sodium and iron is preferable because of easy availability. Inter alia, magnesium silicate tends to improve low temperature impact resistance, moldability, and coating property, being preferable.

Examples of the aluminum silicate include natural aluminum silicate such as kaolin, agalmatolite, cericite, bentonite, and fired clay, and synthetic aluminum silicate such as zeolite, Zeolex and Silteg.

Examples of the magnesium silicate include talc.

Among them, magnesium silicate, which contains hydrous magnesium silicate as a main component, having a composition of about 63 to 64% of $SiO_2$, about 31 to 32% of MgO, and 4 to 5% of $H_2O$ and containing a small amount of iron and lime alumina is easily available, and tends to improve impact resistance, being preferable.

The metal silicate salt has an average particle diameter of usually around 0.5 to 30 μm, preferably 1 to 20 μm. When the average particle diameter is 0.5 μm to 30 μm, dispersibility in the thermoplastic resin is better, and impact resistance of the resulting thermoplastic resin composition tends to be improved, being preferable. Herein, an average particle diameter of the metal silicate salt is a value measured with a precipitation type automatic particle size distribution measuring meter.

A water content of the metal silicate salt is usually around 0.1 to 1% by weight, preferably around 0.1 to 0.3% by weight. When the water content is 0.1% by weight or more, this is preferable due to easy availability and storage. When the water content is 1% by weight or less, there is a tendency that a trouble such as foaming at processing of the thermoplastic resin composition is reduced, being preferable. Herein, the water content of the metal silicate salt is a value measured by the Karl Fischer method.

Examples of a shape of the granular additive composition of the present invention include a "pellet" obtained by granulation using a semi-dry process extruder such as a monoaxial or multiaxial melt extruder and a disk pelleter, a "granule" obtained by stirring granulation, and a "flake" obtained by granulation using compression granulation such as a roller compactor, when a temperature is 80° C. or lower. The shape of the granular additive composition obtained by granulation means a shape classified by definition described in JIS-Z 8841 (1993) Item 10 Explanation Table 1, Shape and Name of Granulated Product. In addition, the granular additive composition of the present invention does not refer to one granule, but means an aggregate of granules.

Since the granular additive composition of the present invention contains the sulfur-based compound (1), it can be easily granulated at 80° C. or lower by any method such as extrusion granulation and stirring granulation. Among them, the granular additive composition of the "granule" obtained by stirring granulation is excellent in dispersibility in a thermoplastic resin, and thermal coloration resistance of the resulting thermoplastic resin composition tends to be improved, being preferable.

The granular additive composition of the "granule" obtained by stirring granulation will be explained below.

Examples of a process for producing the granular additive composition of the "granule" usually include a method of preparing a mixture containing 100 parts by weight of fatty calcium monohydrate, and 7 to 1000 parts by weight of the sulfur-based compound represented by the formula (1) and, if necessary, the phenol-based compound represented by the formula (2), the phosphorus-based compound represented by the formula (3) to the formula (5), fatty acid amide having a carbon atom of 4 to 50 or the metal silicate salt, and stirring-granulating the mixture in a temperature range of 40 to 80° C., preferably 40 to 70° C., particularly preferably 40° C. to 60° C.

When a temperature is 40° C. or higher, granulation tends to be easy, being preferable. When a temperature is 80° C. or lower, water of crystallization of fatty calcium is eliminated with difficulty, and thermal coloration resistance of the resulting thermoplastic resin composition tends to be improved, being preferable. Herein, a temperature is a temperature of the mixture upon granulation.

At least one additive selected from the group consisting of the phenol-based compound represented by the formula (2), the phosphorus-based compound represented by the formula (3) to the formula (5), fatty acid amide having a carbon number of 4 to 50, and the metal silicate salt is used at a total amount of usually 0 to 1800 parts by weight, preferably 10 to 1500 parts by weight.

Examples of an instrument used for stirring granulation include a high speed rotation instrument such as a Henschel mixer, a super mixer, and a high speed mixer, a stirring mixing granulator such as a vertical granulator, and a rolling flowing coating apparatus.

A specific granulation method includes a method of charging, for example, fatty calcium, and the sulfur-based compound (1) and, if necessary, the phenol-based compound (2), the phosphorus-based compound represented by the formula (3) to the formula (5), fatty acid amide or the metal silicate salt into a mixing machine such as a Henschel mixer, and stirring and mixing materials at a high speed, and a method of spraying a heated and melted sulfur-based compound (1) to, for example, fatty calcium monohydrate and an additive which is added if necessary, mixing materials, and cooling the mixture under stirring.

Examples of a method of setting a temperature at 40 to 80° C. include a method of warming by attaching a warm water jacket to a Henschel mixer, and a method of raising a temperature utilizing shearing heat generated accompanied with high speed stirring.

Among the above methods, a method of charging a mixing machine such as a Henschel mixer with fatty calcium monohydrate, the sulfur-based compound (1) and an optionally added additive, and stirring and mixing materials at a high speed is simple in operation, being particularly preferable.

The thus obtained granular additive composition is small in a dust flying amount due to little fine powder, and is better is flowability. Although a fine powder may be removed from the resulting granular particulate composition by sieving operation, since the granular additive composition of the present invention is small in a fine dust amount, a sieving step may be omitted. That is, a content of a fine powder having a particle diameter of 60 μm or less is usually 10 by weight based on the granular additive composition. Thereby, generation of a dust from the granular additive composition is remarkably suppressed.

Examples of a method of reducing a component having a particle diameter of 60 μm or less include a method of mixing and granulation for a longer time, for example, a method of increasing a content of the sulfur-based compound (1).

A median diameter (weight basis) of the granular additive composition of the present invention is usually 80 to 2000 μm.

When the median diameter is 80 μm or larger, generation of a dust tends to be suppressed, being preferable.

When the median diameter is 2000 μm or smaller, dispersibility of phosphite ester into a thermoplastic resin tends to be excellent, being preferable.

Particularly, it is preferable that an average particle diameter is 90 to 1000 μm.

The median diameter (weight basis) in the present invention is such that about 3 g of a sample is sieved using a robot shifter (manufactured by SEISHIN ENTERPRISE CO., LTD) mounted with a standard sieve of JIS Z 8801 at a vibration level of 8., a shift time of 3 minutes, and a pulse interval of 1 second, and an average particle diameter of a weight basis is obtained from an opening of a sieve and a weight of particles remaining on a sieve.

Examples of a process for producing the granular additive composition having such the average particle diameter include a method of using a stirring granulator in which a clearance between a tip part of a stirring wing in the interior of the stirring granulator and a wall surface in the interior of the stirring granulator is adjusted at 30 mm or less, in the stirring granulator having the stirring wing.

Then, the granular additive composition consisting of the pellet-like "granule" obtained by extrusion granulation (hereinafter, referred to as pellet-like additive composition in some cases) will be explained.

Examples of a process for producing the pellet-like additive composition usually include a process of preparing a mixture containing of 100 parts by weight of fatty calcium monohydrate, and 7 to 1000 parts by weight of the sulfur-based compound represented by the formula (1) and further, if necessary, the phenol-based compound represented by the formula (2), the phosphorus-based compound represented by the formula (3) to the formula (5), fatty acid amide having a carbon number of 4 to 50 or the metal silicate salt, and extrusion-granulating the mixture in a temperature range of 40 to 80° C., preferably 40 to 70° C., particularly preferably 40 to 60° C.

When a temperature is 40° C. or higher, extrusion granulation tends to be easy, being preferable. When a temperature is 80° C. or lower, water of crystallization of fatty calcium is eliminated with difficulty, and thermal coloration resistance of the resulting thermoplastic resin composition tends to be improved, being preferable. Herein, a temperature is a temperature of the mixture upon extrusion granulation.

At least one additive selected from the group consisting of the phenol-based compound represented by the formula (2), the phosphorus-based compound represented by the formula (3) to the formula (5), fatty acid amide having a carbon number of 4 to 50 and the metal silicate salt is used at a total amount of usually 0 to 1800 parts by weight, preferably 10 to 1500 parts by weight.

Examples of an instrument used in extrusion granulation include a monoaxial or multiaxial melting extruder, and a semi-drying extruder such as a disk pelleter.

As a specific granulation method, for example, a mixture containing 100 parts by weight of fatty calcium, and 7 to 1000 parts by weight of the sulfur-based compound represented by the formula (1) and further, if necessary, the phenol-based compound represented by the formula (2), the phosphorus-based compound represented by the formula (3) to the formula (5), fatty acid amide or the metal silicate salt is prepared with a mixing machine such as a Henschel mixer and a super mixer, the mixture is placed into an extruder through a hopper, and a material temperature in the extruder is adjusted to 40° C. to 80° C. with shearing heat of the extruder, or a heating facility, thereby, the mixture can be easily extruded to obtain a pillar granulated product. The extruded pillar granulated product is cut into a suitable length with a cutter, thereby, a pellet-like additive composition can be obtained.

Thus, the pellet-like additive composition is obtained, and the pellet-like additive composition of an arbitrary size can be obtained by adjusting an aperture of a die, an extrusion rate, and a cutting rate and, from a viewpoint of dispersibility, it is preferable that a diameter is in a range of 2 to 5 mm, and a length is in a range of 2 to 5 mm.

The granular additive composition of the present invention contains, as an essential component, 5 to 70% by weight of fatty calcium, and 5 to 50% by weight of the sulfur-based compound (1) and, in the present invention, it is not meant that one particle contains fatty calcium and the sulfur-based compound (1) at the above weight ratio, but meant that 5 to 70% by weight of fatty calcium and 5 to 50% by weight of the sulfur-based compound (1) are contained based on the whole granular additive composition.

When an infrared spectrum of the thus obtained granular additive composition is measured, the composition has a maximum absorption peak A having maximum absorbance in a range of a wave number 1540 $cm^{-3}$ to 1543 $cm^{-1}$. When fatty calcium is a monohydrate, usually, an infrared absorption spectrum of a wave number 1540 $cm^{-1}$ to 1543 $cm^{-1}$ shows one maximum absorption peak of only the peak A.

In addition, the composition has a maximum absorption peak B having maximum absorbance in a range of a wave number 1575 $cm^{-1}$ to 1583 $cm^{-1}$. When fatty calcium is a monohydrate, usually, an infrared absorption spectrum of a wave number 1575 cm$^{-1}$ to 1583 cm$^{-1}$ shows one maximum absorption peak of only the peak B.

In an infrared absorption spectrum of the present granular additive composition, the peak A and the peak B are maximum absorption peaks in which absorbance has a maximum value and a value next thereto, in a range of a wave number 1540 cm$^{-1}$ to 1583 cm$^{-1}$.

A maximum absorption peak having absorbance of a maximum value may be the peak A or the peak B and, when a granular additive composition having a maximum absorption peak exceeding the peak A or the peak B in a range of a wave number 1540 cm$^{-1}$ to 1583 cm$^{-1}$ is used, thermal coloration resistance of the resulting thermoplastic resin composition is reduced, being not preferable.

Inter alia, the granular additive composition in which an infrared absorption spectrum shows a maximum absorption peak of only the peak A and the peak B in a range of wave number 1540 cm$^{-1}$ to 1583 cm$^{-1}$ is preferable because thermal coloration resistance of the resulting thermoplastic resin composition is further improved without losing almost all water of crystallization of fatty calcium monohydrate in the granular additive composition.

The infrared absorption spectrum is a spectrum obtained by subtracting absorption of a KBr tablet containing no granular additive composition which is measured as background, from absorption measured using a KBr tablet containing a granular additive composition as a sample. Thereupon, by making the KBr tablet containing no granular additive composition thicker than the KBr tablet containing a granular additive composition, an infrared spectrum generating no noise can be obtained.

The granular additive composition of the present invention is preferable as an additive composition of a thermoplastic resin which is easily deteriorated by heat or light.

Examples of a preferable thermoplastic resin in the granular additive composition of the present invention include a polypropylene-based resin, a polyethylene-based resin such as high density polyethylene (HD-PE), low density polyethylene (LD-PE), and linear low density polyethylene (LLDPE), a methylpentene polymer, an ethylene/ethyl acrylate copolymer resin, an ethylene/vinyl acetate copolymer resin, polystyrenes such as, polystyrene, poly(p-methylstyrene), and poly(α-methylstyrene), an acrylonitrile/styrene copolymer resin, an acrylonitrile/butadiene/styrene copolymer resin, a special acryl rubber/acrylonitrile/styrene copolymer resin, an acrylonitrile/chlorinated polyethylene/styrene copolymer resin, chlorinated polyethylene, polychloroprene, a chlorinated rubber, polyvinyl chloride, polyvinylidene chloride, a methacryl resin, an ethylene/vinyl alcohol copolymer resin, 1,2-polybutadiene, polyisoprene, a styrene/butadiene copolymer, a butadiene/acrylonitrile copolymer, polyolefin such as an ethylene/propylene copolymer and an ethylene/methyl methacrylate copolymer, a polyester resin such as polyethylene terephthalate and polybutylene terephthalate, a fluorine resin, polyacetal, a grafted polyphenylene ether resin, a polyphenylene sulfide resin, polyurethane, polyamide, polycarbonate, polyacrylate, polysulfone, polyether ether ketone, polyether sulfone, aromatic polyester resin, a diallylphthalate prepolymer, and a silicone resin. Among them, from a viewpoint of better moldability, polyolefin such as a polyethylene-based resin and a polypropylene-based resin is preferable and, inter alia, a polypropylene-based resin is preferable.

Herein, the polypropylene-based resin means polyolefin containing a structural unit derived from propylene, specifically, examples include a crystalline propylene homopolymer, a propylene-ethylene random copolymer, a propylene-α-olefin random copolymer, a propylene-ethylene-α-olefin copolymer, and a polypropylene-based block copolymer consisting of a propylene homopolymer component or a copolymer component consisting mainly of propylene, and a copolymer component of propylene, ethylene and/or α-olefin.

When the polypropylene-based resin is used as a thermoplastic resin used in the present invention, as the polypropylene-based resin, one kind may be used, or two or more kinds may be used by blending them.

The α-olefin is usually α-olefin having a carbon number of 4 to 12, and examples include 1-butene, 1-pentene, 1-hexene, 4-methyl-1-pentene, 1-octene, and 1-decene. Further preferable are 1-butene, 1-hexene, and 1-octene.

Examples of the propylene-α-olefin random copolymer include a propylene-1-butene random copolymer, a propylene-1-hexene random copolymer, and a propylene-1-octene random copolymer.

Examples of the propylene-ethylene-α-olefin copolymer include a propylene-ethylene-1-butene copolymer, a propylene-ethylene-1-hexene copolymer, and a propylene-ethylene-1-octene copolymer.

Examples of the copolymer component consisting mainly of propylene in the polypropylene-based block copolymer consisting of a propylene homopolymer component or a copolymer component consisting mainly of propylene, and a copolymer component of propylene, ethylene and/or α-olefin include a propylene-ethylene copolymer component, a propylene-1-butene copolymer component, and a propylene-1-hexene copolymer component, examples of the copolymer component of propylene, ethylene and/or α-olefin include a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, and a propylene-1-octene copolymer component. A content of ethylene and/or α-olefin having a carbon number of 4 to 12 in the copolymer component of propylene, ethylene and/or α-olefin is usually 0.01 to 20% by weight.

Examples of the polypropylene-based block copolymer consisting of a propylene homopolymer component or a copolymer component consisting mainly of propylene, and a copolymer component of propylene, ethylene and/or α-olefin include a propylene-ethylene block copolymer, a (propylene)-(propylene-ethylene) block copolymer, a (propylene)-(propylene-ethylene-1-butene) block copolymer, a (propylene)-(propylene-ethylene-1-hexene) block copolymer, a (propylene)-(propylene-1-butene) block copolymer, a (propylene)-(propylene-1-hexene) block copolymer, a (propylene-ethylene)-(propylene-ethylene-1-butene) block copolymer, a (propylene-ethylene)-(propylene-ethylene-1-hexene) block copolymer, a (propylene-ethylene)-(propylene-1-butene) block copolymer, a (propylene-ethylene)-(propylene-1-hexene) block copolymer, a (propylene-1-butene)-(propylene-ethylene) block copolymer, a (propylene-1-butene)-(propylene-ethylene-1-butene) block copolymer, a (propylene-1-butene)-(propylene-ethylene-1-hexene) block copolymer, a (propylene-1-butene)-(propylene-1-butene) block copolymer, and a (propylene-1-butene)-(propylene-1-hexene) block copolymer.

In addition, when the polypropylene-based resin is used as the thermoplastic resin, it is preferably a crystalline propylene homopolymer, or a propylene-based block copolymer consisting of a propylene homopolymer component or a copolymer component consisting mainly of propylene, and a copolymer component of propylene, ethylene and/or α-olefin having a carbon number of 4 to 12, further preferably a propylene-based block copolymer consisting of a propylene homopolymer component or a copolymer component consisting mainly of propylene, and a copolymer component of propylene, ethylene and/or α-olefin having a carbon number of 4 to 12.

From a viewpoint of rigidity and flaw resistance, it is preferable that crystallizability of the polypropylene-based resin is higher. As the polypropylene-based resin having high crystallizability, a resin having 0.95 or higher of a fraction of a propylene monomer unit at a center of a chain in which five consecutive propylene monomer units being a pentad unit in a polypropylene molecule are meso-bound (referred to as pentad fraction, expressed by [mmmm]), which is obtained by the method published by A. Zambelli et al. (Macromolecules 6,925,1973), is preferable.

A process for producing the thermoplastic resin used in the present invention is not particularly limited, but a thermoplastic resin produced by the known polymerization method using the previously known appropriate polymerization catalyst can be used. Alternatively, a commercially available thermoplastic resin may be used.

When the polypropylene-based resin is used as the thermoplastic resin used in the present invention, examples of a polymerization catalyst include a Ziegler-type catalyst, a Ziegler-Natta-type catalyst, a catalyst system consisting of a Periodic Table Group IV transition metal compound having a cyclopentadienyl ring, and alkylaluminoxane, and a catalyst system consisting of a Periodic Table Group IV transition metal compound having a cyclopentadienyl ring, a compound which reacts therewith to form an ionic complex, and an organic aluminum compound.

In addition, when the thermoplastic resin used in the present invention is the polypropylene-based rein, examples of a method of polymerizing this include a slurry polymerization method using an inert hydrocarbon solvent, a solvent polymerization method, a liquid phase polymerization method without a solvent, a gas phase polymerization method, and a liquid phase-gas phase polymerization method of continuously performing them. These polymerization methods may be a batch process, or a continuous process, and may be a method of producing the polypropylene-based resin at a single stage, or a method of producing the polypropylene-based resin at a multi-stage of two or more stages. In particular, an example of a process for producing the polypropylene-based block copolymer consisting of a propylene homopolymer component or a copolymer component consisting mainly of propylene, and a copolymer component of propylene, ethylene and/or α-olefin having a carbon number of 4 to 12 includes a multi-stage production process of two or more stages, consisting of a stage of producing a propylene homopolymer component or a copolymer component consisting mainly of propylene, and a stage of producing a copolymer component of propylene, ethylene and/or α-olefin having a carbon number of 4 to 12.

A melt index (MI) of the thermoplastic resin used in the present invention, for example, in the case of the polypropylene-based resin, is preferably in a range of 0.01 to 100 g/10 min (230° C.) from a viewpoint of molding processability.

An addition amount of the granular additive composition of the present invention is usually in a range of 0.03 to 5 parts by weight, preferably in a range of 0.05 to 2 parts by weight, particularly preferably in a range of 0.1 to 1 part by weight based on 100 parts by weight of the thermoplastic resin. When an addition amount of the granular additive composition is 0.03 part by weight or more, processing stability tends to be improved, being preferable. Even when the composition is added at an amount more than 5 parts by weight, improvement in stability balanced with addition is not recognized, being economically disadvantageous.

Examples of a method of incorporating the granular additive composition into the thermoplastic resin include a method of mixing the granular additive composition and the thermoplastic resin and, thereafter, melting-kneading the mixture with a monoaxial or multiaxial extruder, for example, a method of feeding a liquid obtained by dissolving or suspending the granular additive composition in a solvent in advance to a solution after polymerization of the thermoplastic resin and, thereafter, removing the solvent by a method such as evaporation and distillation off.

The thus obtained thermoplastic resin can be processed into products such as films, molding materials and pipes.

EXAMPLES

The present invention will be explained in more detail below by way of Examples. Part and % mean a weight basis unless otherwise is indicated. A water content was obtained according to JIS K0068 (coulometry).

Additives used in Examples are as follows:

Fatty calcium: Calcium stearate (manufactured by KYODO CHEMICAL CO., LTD)

Sulfur-based compound (1-1): 3,3'-Thiodipropionic acid di-n-dodecyl ester (water content 0.03%)

Sulfur-based compound (1-2): Tetrakis(3-dodecylthiopropionic acid) pentaerythrityl ester (water content: 0.01%)

Phenol-based compound (2-1): 3,9-Bis[2-{3-(3-t-butyl-4-hydroxy-5-methylphenyl)propionyloxy}-1,1-dimethylethyl]-2,4,8,10-tetraoxaspiro[5-5]undecane (water content 0.08%)

Phenol-based compound (2-2): Tetrakis{3-(3,5-di-t-butyl-4-hydroxyphenyl)-propionic acid}pentaerythrityl ester Phosphorus-based compound (3-1): Tris(2,4-di-t-butylphenyl) phosphite (water content 0.04%) Phosphorus-based compound (4-1): Bis(2,4-di-t-butylphenyl) pentaerythritol diphosphite (water content 4.10%)

Phosphorus-compound (5-1): 6-[3-(3-t-butyl-4-hydroxy-5-methylphenyl)propoxy]-2,4,8,10-tetra-t-butyldibenzo[d,f][1,3,2]dioxaphosphepine Oleic acid amide: Denon SL-12 (manufactured by MARUBISHI OIL CHEMICAL CO., LTD.) (water content: 0.02%)

Talc: Micronwhite 5000s (manufactured by HAYASHI KASEI Co., Ltd.) (water content 0.27%)

(Measurement of Infrared Spectrum)

A granular additive composition and KBr were rapidly ground for about one minute, and mixed in a mortar, and the mixture was immediately placed into a tablet molding equipment, and pelletized.

Separately, a sample chamber of an apparatus, IRP restige-21 manufactured by Shimadzu Corporation was purged with nitrogen for about 10 minutes to place under the nitrogen atmosphere, the resulting pellet was set into the sample chamber, and an infrared absorption spectrum 1 was measured under the condition of resolution of 4 cm$^{-1}$ and an accumulation time of 40. Such the pellet was used that an amount of the granular additive composition was adjusted so that absorbance of the resulting infrared absorption spectrum was 1.3 or lower.

A KBr pellet not containing a granular additive composition was similarly made, and an infrared absorption spectrum 2 was similarly measured. Thereupon, an amount of KBr was slightly larger than an amount of the KBr pellet containing a granular-additive composition, and a thickness of the KBr pellet was adjusted to be slightly greater than a thickness of the KBr pellet containing the granular additive composition.

As an infrared absorption spectrum of the granular additive composition, the result obtained by subtracting a value of an infrared absorption spectrum 2 from an infrared absorption spectrum 1 using the same apparatus.

(Calculation of Water Content in Calcium Stearate, in Granular Additive Composition)

In the granular additive composition, a water content of calcium stearate, that is, a ratio of water relative to calcium stearate, in calcium stearate contained in the granular additive composition was obtained by the following equation.

$$R_w = \frac{P - \sum \frac{q_i}{100} \times Q_i}{\frac{r}{100}}$$

Rw: Ratio of water relative to calcium stearate, in calcium stearate contained in granular additive composition (water content, %)
r: Ratio of calcium stearate relative to granular additive composition (content, %)
P: Ratio of total water contained in granular additive composition (water content, %)
Qi: Ratio of water contained in additive Qi (water content, %)
qi: Ratio of additive Qi contained in granular additive composition (content, %)

In Example 1, the additive Qi is three components of the sulfur-based compound (1-1), the phenol-based compound (2-1), and the phosphorus-based compound (3-1), a right member of a numerator of the above equation is a ratio of water contained in components other than calcium stearate relative to the granular additive composition, and a numerator of the above equation is a ratio of water contained in calcium stearate relative to the granular additive composition.

And, r was obtained from a mixing amount of calcium stearate in a mixture, qi was obtained from a mixing amount of a component used in a mixture, P was obtained from the obtained granular additive composition according to JIS K0068, and Qi was obtained for each component used according to JIS K0068 before mixing.

Example 1

Production Example of Granular Additive Composition 1

Figure 1:
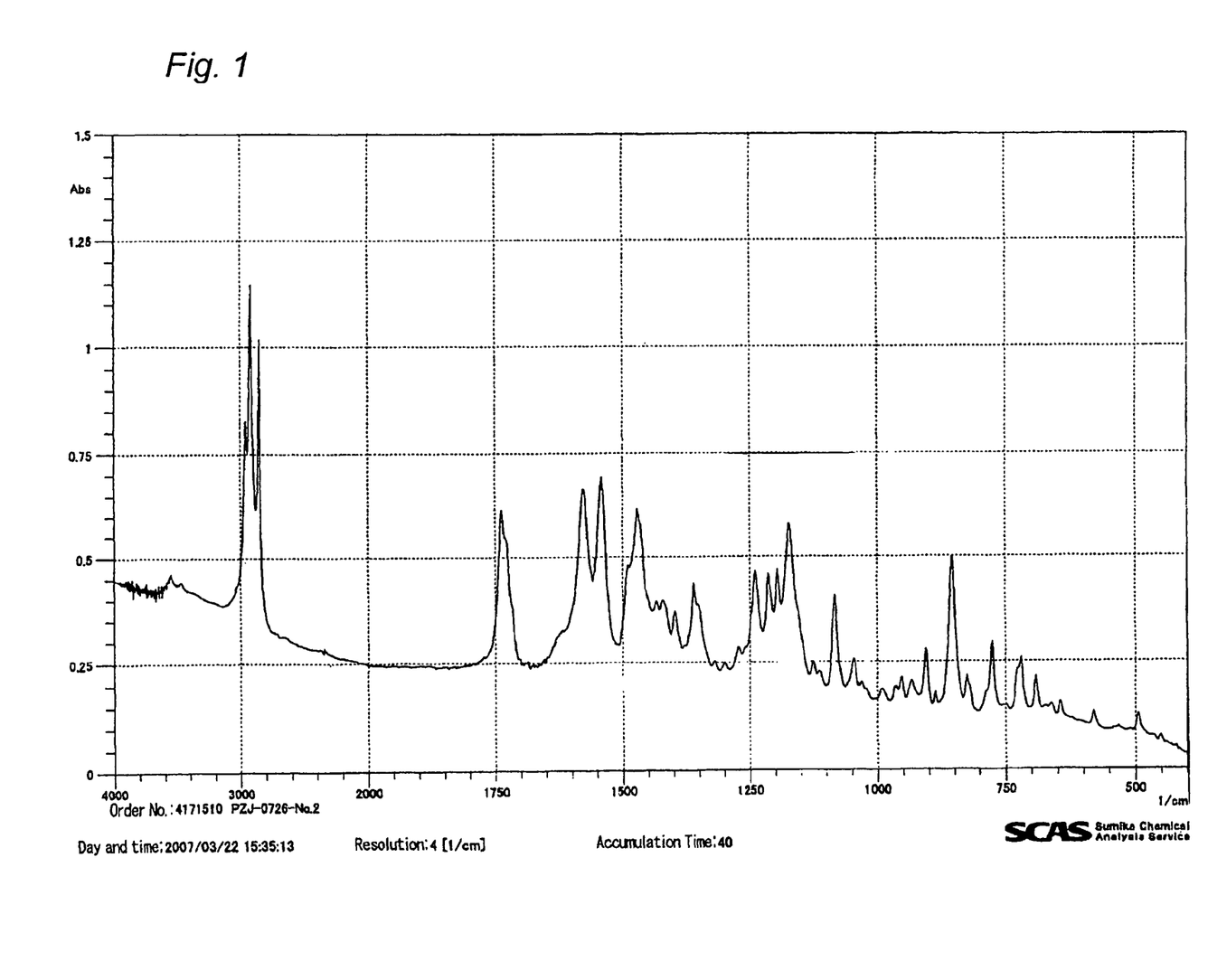
FIG. 1 is an infrared absorption spectrum of the granular additive composition 1 used in Example 1 and Example 2.

A 10 L Henschel mixer was charged with 400 g of calcium stearate monohydrate, 300 g of the sulfur-based compound (1-1), 100 g of the phenol-based compound (2-1), and 200 g of the phosphorus-based compound (3-1), and the mixture was stirred at a high speed at a jacket temperature of 50° C. and at a rotation number of 1000 rpm. Four minutes after stirring initiation, a material temperature was risen to 46° C. and, at the same time, a stirring power became 3.8 ampere. Further, 35 to 45 seconds thereafter, since a stirring power indicated 6 to 7 ampere, stirring was stopped at that point. From a discharge outlet, 1 kg of a granular additive composition 1 was obtained. A water content of the granular additive composition 1 is 1.09%, and a ratio of water relative to calcium stearate, regarding calcium stearate contained in the granular additive composition, is 2.7% from the above equation. A median diameter (weight average) of the granular additive composition was 466 μm, and a content of a fine powder having a particle diameter of 60 μm or smaller was 2%. An infrared absorption spectrum of the granular additive composition 1 is shown in FIG. 1.

Production Example 1 of Thermoplastic Resin Composition

After 2 g of the resulting granular additive composition and 1000 g of polypropylene were dry-blended, the blend was placed into a 30 mm Φ monoaxial extruder, and extruded at 230° C. to obtain a thermoplastic resin composition.

The thermoplastic resin composition was injection-molded with an injection extruder to make a 40×60×1 mm test piece.

Assessment Example 1 of Oxidation Resistance and Thermal Coloration Resistance

The test piece obtained in Production Example 1 of the thermoplastic resin composition was stored in a gear oven at 160° C., and a time until 30% of a surface area was embrittled was measured and found to be 96 hours or longer. In addition, thermal coloration resistance of the test piece obtained in Production Example 1 of the thermoplastic resin composition at molding processing was assessed. A coloration degree (YI value, yellowness) of the test piece was measured according to JIS K7105 (reflection method) and was found to be 0.81.

Example 2

According to the same manner as that of <Production Example 1 of thermoplastic resin composition> and <Assessment Example 1 of oxidation resistance and thermal coloration resistance> except that 5 g of the granular additive composition 1 obtained in Example 1 was used, Example 2 was implemented. Results of assessment together with those of Example 1 are shown in Table 1.

TABLE 1

| | | Granular additive composition | | | | | | Thermoplastic resin composition | | |
|---|---|---|---|---|---|---|---|---|---|---|
| | | Water content of calcium stearate | Median diameter (weight basis) | Content of 60 μm or smaller | Maximum absorption peak (cm$^{-1}$) | | | Incorporation amount of granular additive composition *1 | Oxidation resistance (hr) | Coloration resistance (YI) |
| | No. | | | | 1540~1543 | 1544~1574 | 1575~1583 | | | |
| Example 1 | 1 | 2.7 wt % | 466 μm | 2% | 1541 | No Peak | 1578 | 0.2 | >96 | 0.81 |
| Example 2 | 1 | 2.7 wt % | 466 μm | 2% | 1541 | No Peak | 1578 | 0.5 | >96 | 0.57 |
| Comparative Example 1 | 2 | 1.5 wt % | 481 μm | 5% | 1541 | 1562 | 1582 | 0.2 | >96 | 0.91 |

*1 Part number of granular additive composition incorporated into 100 parts of thermoplastic resin

Comparative Example 1

Production Example of Granular Additive Composition 2

Figure 2:
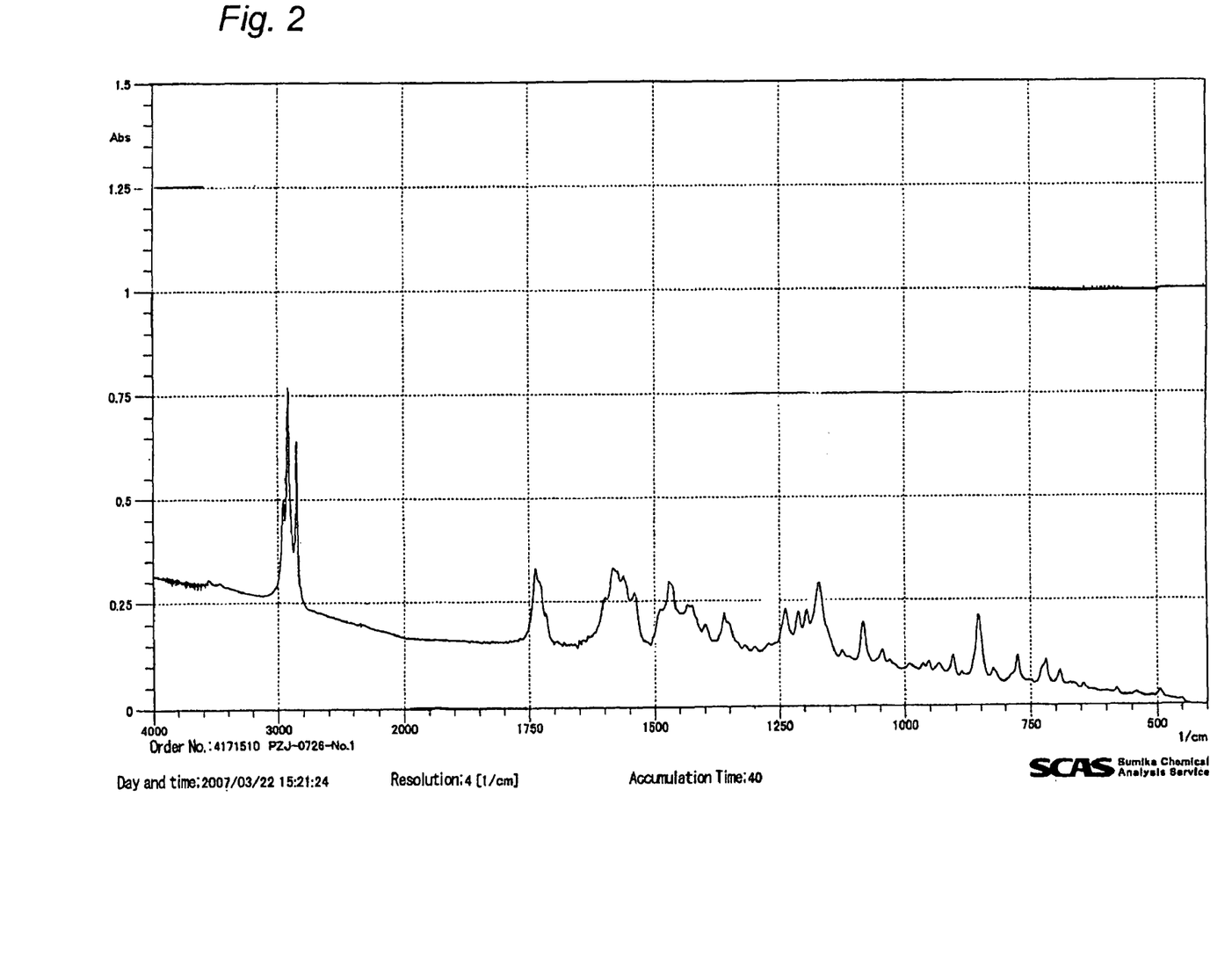
FIG. 2 is an infrared absorption spectrum of the granular additive composition 2 used in Comparative Example 1.

According to the same manner as that of Example 1 except that calcium stearate monostearate was dried at 95° C. for 4 hours, this Example was implemented. A water content of the granular additive composition 2 is 0.62%, and a ratio of water relative to calcium stearate, regarding calcium stearate contained in the granular additive composition, is 1.5% from the above equation. A median diameter (weight average) of the granular additive composition 2 was 481 μm, and a content of a fine powder having a particle diameter of 60 μm or smaller was 5%. An infrared absorption spectrum of the granular additive composition 2 is shown in FIG. 2.

According to the same manner as that of <Production Example 1 of thermoplastic resin composition> and <Assessment Example 1 of oxidation resistance and thermal coloration resistance> except that 2 g of the granular additive composition 2 obtained in Comparative Example 1 was used, production and assessment were implemented. Results are shown in Table 1.

Example 3

Production Example of Pellet-Like Additive Composition 3

Figure 3:
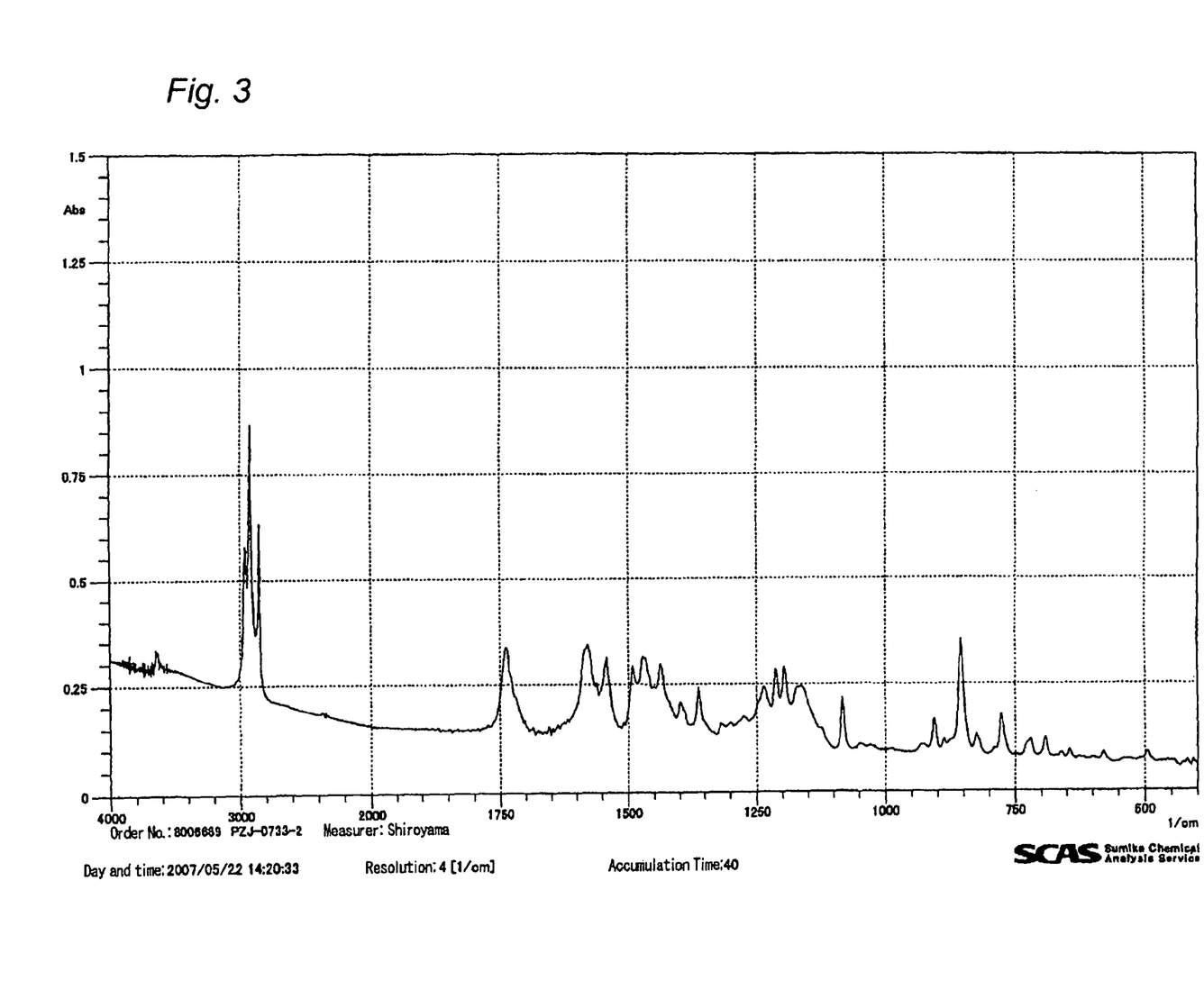
FIG. 3 is an infrared absorption spectrum of a pellet-like additive composition 3 used in Example 3, Example 4 and Example 5.

Four hundreds gram of calcium stearate monohydrate, 200 g of the sulfur-based compound (1-1), 300 g of the phenol-based compound (2-2), and 300 g of the phosphorus-based compound (3-1) were dry-blended to obtain a mixture. When this mixture was placed into a 30 mm Φ biaxial extruder set at the condition described in Table 2, and extruded, a highest material temperature was risen to 75° C., and a pillar additive composition 3 having a diameter of 4 mm was extruded through a die tip. The composition was cut into about 3 to 5 mm with a cutter to obtain a pellet-like additive composition 3. A water content of the pellet-like additive composition 3 is 0.91%, and a ratio of water relative to calcium stearate, regarding calcium stearate contained in the pellet-like additive composition, is 2.2% from the above equation. An infrared absorption spectrum of the pellet-like additive composition 3 is shown in FIG. 3.

<Condition of Biaxial Extruder>

Figure 4:
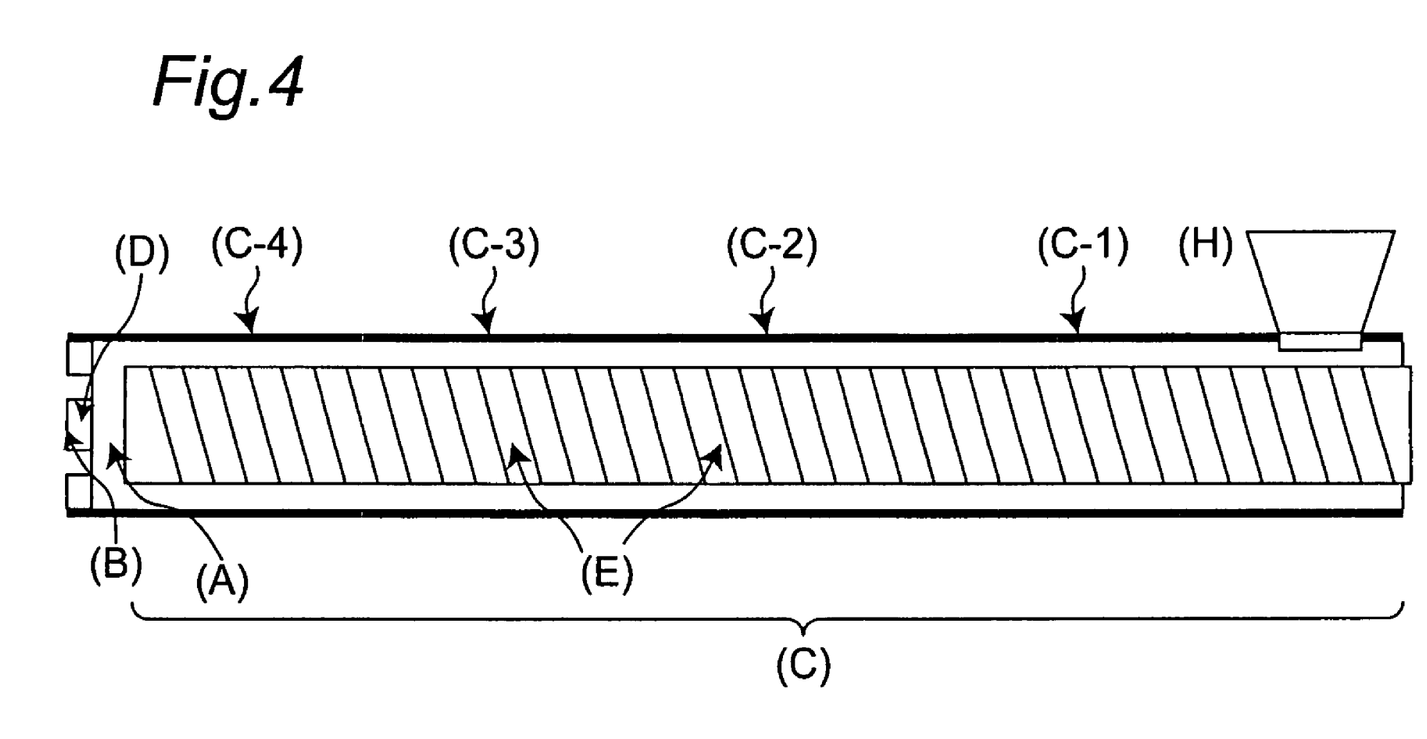
FIG. 4 is a cross-sectional view of a 30 mm Φ biaxial extruder used in production of a pellet-like additive composition.

A 30 mm Φ biaxial extruder (Nakatani Machine. Co.), Model NAS 30 mm Φ biaxial bent-type extruder, L/D:28) shown in FIG. 4 in which C1, C2, C3, C4, A and D were set at temperatures described in Table 2 was used in <Production Example of pellet-like additive composition 3>.

TABLE 2

| Position | C1 | C2 | C3 | C4 | A | D |
|---|---|---|---|---|---|---|
| Set temperature (° C.) | 50 | 50 | 65 | 65 | 65 | 65 |

C1 to C4: Set temperature of extrusion-kneading part A: Set temperature of adapter D: Set temperature of die part

Assessment Example 2 of Oxidation Resistance and Thermal Coloration Resistance According to the same manner as that of Example 1 except that the above-obtained pellet-like additive composition 3 in place of the granular additive composition of Example 1 was incorporated at 0.05 part by weight based on 100 parts by weight of polypropylene, a polypropylene composition was obtained, and oxidation resistance and thermal coloration resistance were assessed. Results of assessment are shown in Table 3.

TABLE 3

| | | Granular additive composition | | | | | Thermoplastic resin composition | | |
|---|---|---|---|---|---|---|---|---|---|
| | | | Content of | Maximum absorption peak (cm$^{-1}$) | | | Incorporation amount of granular additive | Oxidation resistance | Coloration resistance |
| | No. | Water content of calcium stearate | 60 μm or smaller | 1540~1543 | 1544~1574 | 1575~1583 | composition *1 | (hr) | (YI) |
| Example 3 | 3 | 2.2 wt % | 0% | 1541 | No peak | 1578 | 0.05 | 24 | 0.55 |
| Comparative Example 3 | None | — | — | — | — | — | 0 | <12 | 1.06 |
| Example 4 | 3 | 2.2 wt % | 0% | 1541 | No peak | 1578 | 0.1 | >96 | 0.38 |
| Example 5 | 3 | 2.2 wt % | 0% | 1541 | No peak | 1578 | 0.2 | >96 | 0.48 |

*1 Part number of granular additive composition incorporated into 100 parts of thermoplastic resin

Comparative Example 2

Production Example 4 of Pellet-Like Additive Composition

According to the same manner as that of Production Example of pellet-like additive composition 3 of Example 3 except that the setting condition of the 30 mm Φ biaxial extruder of Production Example of the pellet-like additive composition 3 was set at the condition described in Table 4, production of a pellet-like additive composition 4 was tried. However, under at this condition, the composition was liquefied in a cylinder, and an extrudate was also liquid, and could not be obtained as a pellet-like composition.

TABLE 4

| Position | C1 | C2 | C3 | C4 | A | D |
|---|---|---|---|---|---|---|
| Set temperature (° C.) | 50 | 240 | 220 | 200 | 50 | 50 |

C1 to C4: Set temperature of extrusion-kneading part A: Set temperature of adapter part D: Set temperature of die part

Comparative Example 3

According to the same manner as that of Example 1 except that the granular additive composition was not added, a polypropylene composition was produced, and oxidation resistance and thermal coloration resistance were assessed. Results are shown in Table 3.

Examples 4 and 5

According to the same manner as that of Example 1 except that the above-obtained pellet-like additive composition 3 in place of the granular additive composition 1 of Example 1 was incorporated at 0.1 or 0.2 part by weight based on 100 parts by weight of polypropylene, a polypropylene composition was prepared, and oxidation resistance and thermal coloration resistance were assessed. Results of assessment are shown in Table 3.

As also from Tables 1 and 3, it is seen that an infrared absorption spectrum of the granular additive composition of the present invention has two maximum absorption peaks in 1540 cm$^{-1}$ to 1543 cm$^{-1}$, and 1575 cm$^{-1}$ to 1583 cm$^{-1}$, absorbances of the two peaks are such absorbances that they show a maximum value and a next maximum value between 1540 cm$^{-1}$ to 1583 cm$^{-1}$ in an infrared absorption spectrum and, regarding the thermoplastic resin composition (Examples) in which a specified amount of the granular additive composition is incorporated, embrittlement takes a long period of time, oxidation resistance is excellent, a YI value is low, and thermal coloration resistance is excellent.

Example 6

Production Example of Granular Additive Composition 5

Into a 10 L Henschel mixer were placed 600 g of calcium stearate monohydrate and 400 g of the sulfur-based compound (1-2), and the mixture was stirred at a high speed at a jacket temperature of 50° C. and a rotation number of 1000 rpm. Twelve minutes after stirring initiation, a material temperature was risen to 49° C. and, at the same time, a stirring power became 5.0 ampere and, at this time point, stirring was stopped. From a discharge outlet, 1 kg of a granular additive composition 5 was obtained. A water content of the granular additive composition 5 is 1.37%, a ratio of water relative to calcium stearate, regarding calcium stearate contained in the granular additive composition, is 2.3% from the above equation. A median diameter (weight average) of the granular additive composition 5 was 846 μm, and a content of a fine powder having a particle diameter of 60 μm or smaller was 1%. An absorption wave number of an infrared absorption spectrum was 1541, and 1578 nm.

According to the same manner as that of <Production Example of thermoplastic resin composition> and <Assessment Example 1 of oxidation resistance and coloration resistance> except that an amount of the above-obtained granular additive composition 5 in place of the granular additive composition 1 of Example 1 to be incorporated into polypropylene was changed, production and assessment were performed. Results of assessment are summarized in Table 5.

TABLE 5

| | Water | | | | | | Thermoplastic resin composition | | |
|---|---|---|---|---|---|---|---|---|---|
| | content of | | Content | Maximum absorption peak (cm$^{-1}$) | | | Incorporation of granular | | Coloration |
| No. | calcium stearate | Median diameter | of 60 μm or smaller | 1540~1543 | 1544~1574 | 1575~1583 | additive composition | Oxidation resistance | resistance (YI) |
| 4 | 2.3 | 846 | 1 | 1541 | None | 1578 | 0.5 | 24 | 0.72 |

Example 7

Production Example of Granular Additive Composition 6

Into a 10 L Henschel mixer were placed 200 g of calcium stearate monohydrate, 100 g of the sulfur-based compound (1-2), 50 g of the phenol-based antioxidant (2-1), 100 g of the phosphorus-based compound (4-1), 150 g of oleic acid amide (Denon SL-12) and 400 g of talc (Micron White 5000 S), and the mixture was stirred at a high speed and at a jacket temperature of 50° C. and a rotation number of 1000 rpm. Ten minutes after stirring initiation, a material temperature was risen to 50° C. and, at the same time, a stirring power became 5.0 to 6.0 ampere and, at this time point, stirring was stopped. From a discharge outlet, 1 kg of a granular additive composition 6 was obtained. A water content of the granular additive composition 6 is 0.94%, and a ratio of water relative to calcium stearate, regarding calcium stearate contained in the granular additive composition is 2.1% from the above equation. A median diameter (weight average) of the granular additive composition 6 was 299 μm, and a content of a fine powder having a diameter of 60 μm or smaller was 5%. An absorption wave number of an infrared absorption spectrum was 1541, and 1578 nm.

Examples 8-1 to -3, Comparative Example 4

According to the same manner as that of <Production Example 1 of thermoplastic resin composition> and <Assessment Example 1 of oxidation resistance and coloration resistance> except that an incorporation amount of the above-obtained-granular additive composition 6 in place of the granular additive composition 1 of Example 1 to be incorporated into polypropylene was changed, production and assessment were implemented. Results of assessment are summarized in Table 4.

TABLE 6

| | | Water content of | | | Maximum absorption peak (cm$^{-1}$) | | | Thermoplastic resin composition | | |
| --- | --- | --- | --- | --- | --- | --- | --- | --- | --- | --- |
| | | | | Content of | | | | Ratio of granular | | |
| | No. | calcium stearate | Median diameter | 60 μm or smaller | 1540~ 1543 | 1544~ 1574 | 1575~1583 | additive composition | Oxidation resistance (hr) | Coloration resistance (YI) |
| Example 8-1 | 6 | 2.1 | 299 | 5 | 1541 | None | 1578 | 0.05 | 18 | 0.52 |
| Example 8-2 | | | | | | | | 0.5 | 72 | 0.1 |
| Example 8-3 | | | | | | | | 1 | >96 | 0.16 |
| Comparative Example 4 | | | | | | | | 0.01 | <12 | 0.63 |

What is claimed is:

1. A granular additive composition comprising 5 to 70% by weight of calcium stearate having a water content of 2.1 to 2.7%, 5 to 50% by weight of a sulfur-based compound represented by the formula (1), and a phenol-based compound selected from the group consisting of 3,9-bis[2-{3-(3-t-butyl-4-hydroxy-5-methylphenyl)propionyloxy}-1,1-dimethyl-ethyl]-2,4,8,10-tetraoxaspiro[5.5]undecane, bis{3-(3-t-butyl-4-hydroxy-5-methylphenyl) propionic acid} triethylene glycol ester, and tetrakis {3-(3,5-di-t-butyl-4-hydroxyphenyl)-propionic acid} pentaerythrityl ester, wherein an infrared absorption spectrum obtained by measuring the composition has a maximum absorption peak A in which absorbance in a range of a wave number 1540 cm$^{-1}$ to 1543 cm$^{-1}$ is a maximum value, and a maximum absorption peak B in which absorbance in a range of a wave number 1575 cm$^{-1}$ to 1583 cm$^{-1}$ is a maximum value, and the absorbance of the peak A and the absorbance of the peak B are a maximum value and a next maximum value as absorbance of a maximum absorption peak in a range of a wave number 1540 cm$^{-1}$ to 1583 cm$^{-1}$, where in the formula (1), $R_1$ represents an alkyl group having a carbon number of 12 to 18, Y represents a single bond, or a —$C_2H_4CO_2$— group, m represents an integer of 1 to 4, and Z represents a m-hydric alcohol residue having a carbon number of 5 to 18.

2. The granular additive composition according to claim 1, wherein the granular additive composition further comprises at least one phosphorus-based compound represented by the formula (3) to the formula (5), where in the formula (3), three $R_4$s, three $R_5$s, and three $R_6$s each represent independently a hydrogen atom, or a linear alkyl group having a carbon number of 1 to 9, or a branced alkyl group having a carbon number of 3 to 9, where in the formula (4), two $R_7$s, two $R_8$s and two $R_9$s each represent independently a hydrogen atom, an alkyl group having a carbon number of 1 to 9, or a branced alkyl group having a carbon number of 3 to 9, where in the formula (5), two $R_{11}$s, two $R_{12}$s, $R_{14}$ and $R_{15}$ each represent independently a hydrogen atom, a linear alkyl group having a carbon number of 1 to 9, a branched alkyl group having a carbon number of 3 to 9, a cycloalkyl group having a carbon number of 5 to 8, an alkylcycloalkyl group having a carbon number of 6 to 12, an aralkyl group having a carbon number of 7 to 12, or a phenyl group, two $R_{13}$s each represent independently a hydrogen atom or an alkyl group having a carbon number of 1 to 9, B represents a single bond, a sulfur atom, or a —$CHR_{16}$— group, wherein $R_{16}$ represents a hydrogen atom, an alkyl group having a carbon number of 1 to 9, or a cyloalkyl group having a carbon number of 5 to 8, A represents an alkylene group having a carbon number of 2 to 8, or a *—$C(=O)R_{17}$— group, wherein $R_{17}$ represents a single bond, or an alkylene group having a carbon number of 1 to 8, and a symbol * represents a bond with an oxygen atom side of a >P—O— portion, one of C and D represents a hydroxyl group, an alkoxy group having a carbon number of 1 to 8, or an aralkyloxy group having a carbon number of 7 to 12, and the other of C and D represents a hydrogen atom, or an alkyl group having a carbon number of 1 to 8, provided that, when C is a hydroxyl group, one of $R_{14}$ and $R_{15}$ represents a linear alkyl group having a carbon number of 3 to 8, a branched alkyl group having a carbon number of 3 to 8, a cycloalkyl group having a carbon number of 5 to 8, an alkylcycloalkyl group having a carbon number of 6 to 12, an aralkyl group having a carbon number of 7 to 12, or a phenyl group.

3. The granular additive composition according to claim 1, wherein the granular additive composition comprises fatty acid amide having a carbon number of 4 to 50.

4. The granular additive composition according to claim 1, wherein the granular additive composition comprises a metal silicate salt.

5. The granular additive composition according to claim 1, wherein a median diameter (weight basis) of the granular additive composition is 80 μm to 2000 μm.

6. The granular additive composition according to claim 1, wherein the granular additive composition is a pellet-like additive composition having a diameter of 2 to 5 mm and a length of 2 to 5 mm.

7. A thermoplastic resin composition, comprising a thermoplastic resin, and the granular additive composition of claim 1, wherein the granular additive composition is incorporated into the thermoplastic resin at 0.03 to 5 parts by weight based on 100 parts by weight of the thermoplastic resin.

8. The thermoplastic resin composition according to claim 7, wherein the thermoplastic resin is polyolefin.

9. A method for stabilizing a thermoplastic resin, comprising incorporating, into a thermoplastic resin, the granular additive composition as defined in claims 1 at 0.03 to 5 parts by weight based on 100 parts by weight of the thermoplastic resin.

10. The granular additive composition according to claim 2, wherein the granular additive composition comprises fatty acid amide having a carbon number of 4 to 50.

11. The granular additive composition according to claim 2, wherein the granular additive composition comprises a metal silicate salt.

12. The granular additive composition according to claim 3, wherein the granular additive composition comprises a metal silicate salt.

13. The granular additive composition according to claim 2, wherein a median diameter (weight basis) of the granular additive composition is 80 μm to 2000μm.

14. The granular additive composition according to claim 3, wherein a median diameter (weight basis) of the granular additive composition is 80 μm to 2000 μm.

15. The granular additive composition according to claim 4, wherein a median diameter (weight basis) of the granular additive composition is 80 μm to 2000 μm.

16. The granular additive composition according to claim 2, wherein the granular additive composition is a pellet-like additive composition having a diameter of 2 to 5 mm and a length of 2 to 5 mm.

17. The granular additive composition according to claim 3, wherein the granular additive composition is a pellet-like additive composition having a diameter of 2 to 5 mm and a length of 2 to 5 mm.

18. The granular additive composition according to claim 4, wherein the granular additive composition is a pellet-like additive composition having a diameter of 2 to 5 mm and a length of 2 to 5 mm.

19. A thermoplastic resin composition, comprising a thermoplastic resin, and the granular additive composition of claim 2, wherein the granular additive composition is incorporated into the thermoplastic resin at 0.03 to 5 parts by weight based on 100 parts by weight of the thermoplastic resin.

20. A thermoplastic resin composition, comprising a thermoplastic resin, and the granular additive composition of claim 3, wherein the granular additive composition is incorporated into the thermoplastic resin at 0.03 to 5 parts by weight based on 100 parts by weight of the thermoplastic resin.

21. A thermoplastic resin composition, comprising a thermoplastic resin, and the granular additive composition of claim 4, wherein the granular additive composition is incorporated into the thermoplastic resin at 0.03 to 5 parts by weight based on 100 parts by weight of the thermoplastic resin.

22. A thermoplastic resin composition, comprising a thermoplastic resin, and the granular additive composition of claim 5, wherein the granular additive composition is incorporated into the thermoplastic resin at 0.03 to 5 parts by weight based on 100 parts by weight of the thermoplastic resin.

23. A thermoplastic resin composition, comprising a thermoplastic resin, and the granular additive composition of claim 6, wherein the granular additive composition is incorporated into the thermoplastic resin at 0.03 to 5 parts by weight based on 100 parts by weight of the thermoplastic resin.

24. A method for stabilizing a thermoplastic resin, comprising incorporating, into a thermoplastic resin, the granular additive composition of claims 2 at 0.03 to 5 parts by weight based on 100 parts by weight of the thermoplastic resin.

25. A method for stabilizing a thermoplastic resin, comprising incorporating, into a thermoplastic resin, the granular additive composition of claims 3 at 0.03 to 5 parts by weight based on 100 parts by weight of the thermoplastic resin.

26. A method for stabilizing a thermoplastic resin, comprising incorporating, into a thermoplastic resin, the granular additive composition of claims 4 at 0.03 to 5 parts by weight based on 100 parts by weight of the thermoplastic resin.

27. A method for stabilizing a thermoplastic resin, comprising incorporating, into a thermoplastic resin, the granular additive composition of claims 5 at 0.03 to 5 parts by weight based on 100 parts by weight of the thermoplastic resin.

28. A method for stabilizing a thermoplastic resin, comprising incorporating, into a thermoplastic resin, the granular additive composition of claims 6 at 0.03 to 5 parts by weight based on 100 parts by weight of the thermoplastic resin.

* * * * *